(12) United States Patent
Wieting

(10) Patent No.: US 8,494,763 B1
(45) Date of Patent: *Jul. 23, 2013

(54) CENTER PIVOT IRRIGATION SYSTEM POSITION SENSING SYSTEM

(76) Inventor: Mel Wieting, Huron, SD (US)

(*) Notice: Subject to any disclaimer, the term of this patent is extended or adjusted under 35 U.S.C. 154(b) by 0 days.

This patent is subject to a terminal disclaimer.

(21) Appl. No.: 13/447,996

(22) Filed: Apr. 16, 2012

Related U.S. Application Data

(63) Continuation of application No. 13/050,534, filed on Mar. 17, 2011, now Pat. No. 8,185,303, which is a continuation of application No. 11/649,555, filed on Jan. 4, 2007, now Pat. No. 7,953,550.

(51) Int. Cl.
*B05B 12/00* (2006.01)

(52) U.S. Cl.
USPC .............................................. 701/408; 239/63

(58) Field of Classification Search
USPC ............... 701/408; 700/284; 239/63–74, 159, 239/723, 78
See application file for complete search history.

(56) References Cited

U.S. PATENT DOCUMENTS

| | | | |
|---|---|---|---|
| 3,558,258 A | 1/1971 | Johnson | |
| 3,802,627 A | 4/1974 | Seckler | |
| 4,033,508 A | 7/1977 | Jacobi | |
| 4,186,880 A | 2/1980 | Jacobi | |
| 4,191,207 A | 3/1980 | Jacobi | |
| 4,382,550 A | 5/1983 | Olson | |
| 5,927,603 A | 7/1999 | McNabb | |
| 6,254,018 B1 | 7/2001 | Ostrom | |
| 6,290,151 B1 | 9/2001 | Barker | |
| 6,512,992 B1 | 1/2003 | Fowler et al. | |
| 6,666,384 B2 | 12/2003 | Prandi | |
| 6,726,132 B2 * | 4/2004 | Malsam | 239/729 |
| 6,923,390 B1 * | 8/2005 | Barker | 239/729 |
| 6,928,339 B2 | 8/2005 | Barker | |
| 6,937,334 B2 | 8/2005 | Monshouwer | |
| 7,156,328 B2 | 1/2007 | Samaha | |
| 7,461,798 B1 | 12/2008 | Malsam | |
| 7,567,858 B1 | 7/2009 | Dunlap | |
| 7,584,053 B2 | 9/2009 | Abts | |
| 7,584,058 B2 | 9/2009 | Zabeau | |

* cited by examiner

*Primary Examiner* — Dalena Tran
(74) *Attorney, Agent, or Firm* — Jeffrey A. Proehl; Woods, Fuller, Shultz & Smith, P.C.

(57) ABSTRACT

A method for determining a position of a rotatable arm of a center pivot irrigation system may comprise providing a pivot arm position sensing system including a tower unit positionable at the rotatable arm and a GPS receiver at the tower unit, and receiving, from a user over a communication network, a schedule for operating the irrigation system as the rotatable arm rotates. The schedule may include at least two instructions for taking an action by the irrigation system with each instruction including an action and a corresponding location for the action. The method may further include downloading the schedule over a communication network to storage on the position sensing system, determining a location of the tower unit as the tower unit moves about the center of rotation using the GPS receiver, and initiating an action when the location corresponds to the location in one of the instructions.

27 Claims, 8 Drawing Sheets

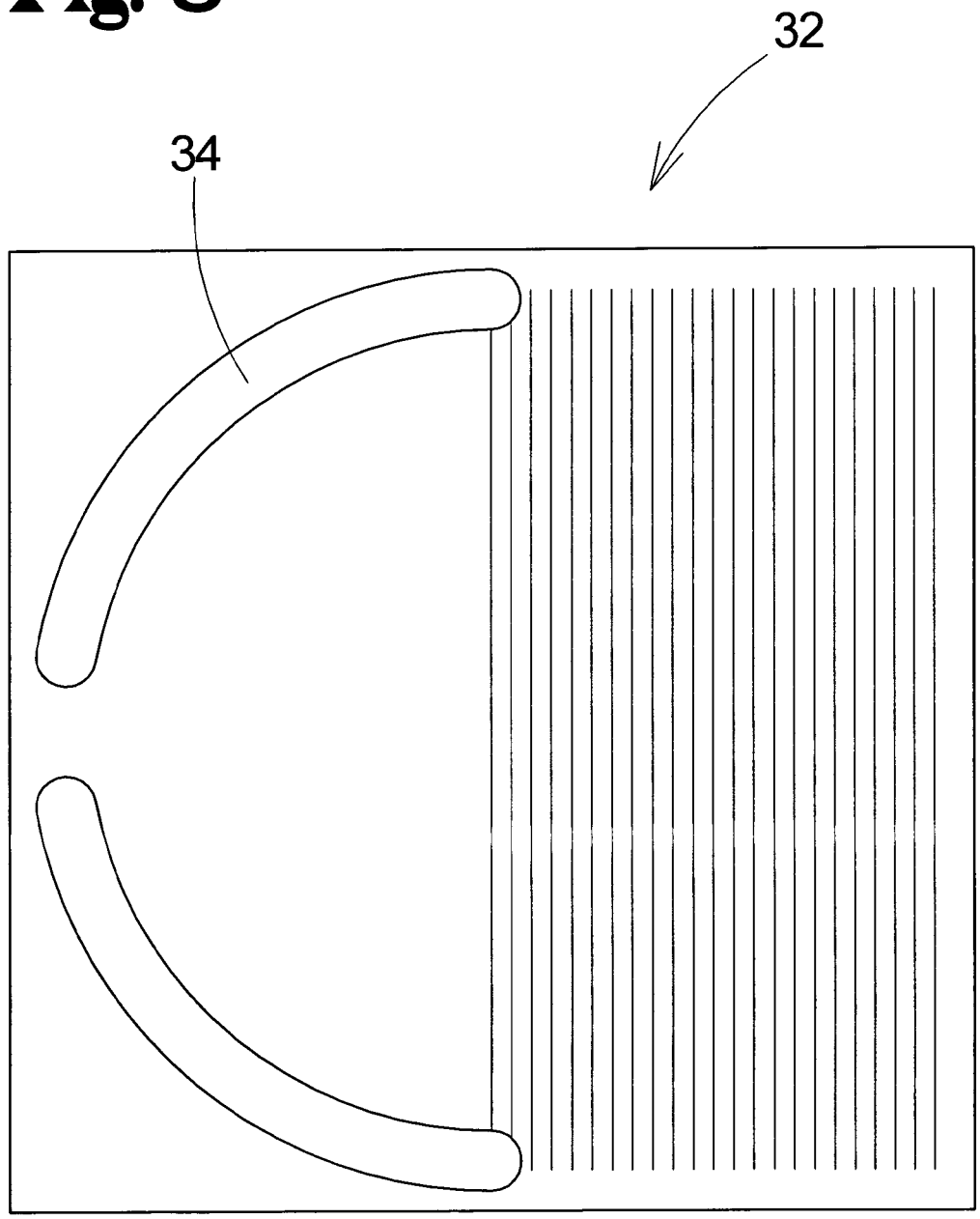

CENTER PIVOT IRRIGATION SYSTEM POSITION SENSING SYSTEM

REFERENCE TO RELATED APPLICATION

This application is a continuation of U.S. patent application Ser. No. 13/050,534 filed Mar. 17, 2011, which was issued on May 22, 2012 as U.S. Pat. No. 8,185,303, which was a continuation of U.S. patent application Ser. No. 11/649,555 filed Jan. 4, 2007, which was issued on May 31, 2011 as U.S. Pat. No. 7,953,550, each of which are hereby incorporated by reference in their entireties.

BACKGROUND OF THE INVENTION

1. Field of the Invention

The present invention relates to apparatus for sensing the position of a center pivot irrigation system in a field, and more particularly pertains to a new system for determining the position of the rotatable arm of a center pivot irrigation system using data from a Global Positioning Satellite (GPS), which may be used in controlling various aspects of the function of the center pivot irrigation system using a network-based system interface.

2. Description of the Prior Art

Irrigation systems have been employed for years to distribute water to areas of land on which a crop is growing. One type of irrigation system, the so-called "center pivot" system, employs a central tower about which a rotatable arm pivots, or rotates, at an elevated position above the ground. A conduit extends along this rotatable arm and radiates outwardly from the center tower, and water is sprayed or otherwise distributed from the conduit at points along the conduit. The rotatable arm includes one or more towers to maintain the conduit in the elevated position above the ground, and each of the towers is typically supported by one or more wheels that rotate while the rotatable arm is pivoted about the center tower. The radially-outermost tower is typically called the end tower, and the end tower may include an "end gun" that sprays water radially outward from the end tower of the rotatable arm.

A number of operational aspects of the center pivot may be controlled, including the starting and the stopping points for the rotatable arm as well as the "on" and "off" points for the end gun, which may be turned off while the rest of the center pivot system continues to distribute water (such as when the end gun would spray water on a road adjoining the field). Conventionally these aspects are controlled in the field by a controller that is positioned in the field and programmed in the field. The operation of the various aspects of the center pivot irrigation system is then keyed upon the angular position of the rotatable arm, which is often determined by a sensor at the center tower that detects the movement or the angular position of the rotatable arm relative to a reference angular position, such as a northward extending position. Thus, as the rotatable arm pivots and the angular position of the rotatable arm changes, various operational aspects of the center pivot irrigation system may be initiated, adjusted, or terminated.

Recently, there have been attempts to use Global Positioning System (GPS) technology to determine the orientation of the rotatable arm, using one, two, three or more GPS antenna/receiver units. However, the systems tend to be relatively complex, particularly since the known GPS-based systems still rely upon the technique of determining the angular orientation of the rotatable arm for controlling the center pivot irrigation system. For example, the system described in U.S. Pat. No. 6,928,339 to Barker requires the user to determine the coordinates of the location of the center pivot in the field, program the coordinates of the center pivot location into the control system in the field, and then the system continuously calculates and recalculates the azimuth or angular orientation of the rotatable arm using the coordinates of the center pivot location and the coordinates supplied by a GPS receiver unit mounted on one of the towers, and then compares the current azimuth with the azimuths associated with various actions for the irrigation system in an operational program stored on the irrigation system. This approach is believed to be unnecessarily complex for this purpose, and does not readily lend itself to remotely monitoring of the angular orientation of the rotatable arm, or to remotely controlling the operation of the various aspects of the center pivot irrigation system.

Further, most if not all known systems utilize monitoring and programming operations that are performed in the field, or at least must be changed in the field, and this factor makes the operation of the system more difficult, or at least inconvenient, for the operator of the system, especially for operators that are responsible for monitoring and controlling multiple center pivot irrigation systems.

It is therefore believed that there is a need for a position sensing and controlling system for center pivot irrigation system that facilitates remote monitoring and controlling of a center pivot irrigation system that is not unnecessarily complex in design.

SUMMARY OF THE INVENTION

The present invention provides a new irrigation arm position sensing system wherein the same can be utilized for determining the position of the rotatable arm of a center pivot irrigation system using data from a GPS receiver, and may be used for controlling the center pivot irrigation system using a network-based system interface.

In general, the invention employs a system of determining a location of an element located on the rotatable arm of the center pivot irrigation system to determine a position of the rotatable arm relative to the center pivot.

To attain this, the present invention generally comprises a method for determining a position of a rotatable arm of a center pivot irrigation system. The method may comprise positioning a tower unit on the rotatable arm of the irrigation system, determining a distance between a center of rotation of the rotatable arm and the tower unit, calculating coordinates of the tower unit along a path of the tower unit as the rotatable arm pivots about the center of rotation, and associating an action of the irrigation system with coordinates of the location of the tower unit that correspond to the position of the rotating arm where the action of the irrigation system is to occur.

Optionally, the action of the irrigation system and the coordinates of the location of the tower unit may be downloaded to a remote unit located adjacent to the center pivot irrigation system. Also, current location coordinates of the tower unit may be determined using a Global Positioning Satellite (GPS) receiver at the tower unit. Further, the current location coordinates of the tower unit may be transmitted from the tower unit to the remote unit. The current location coordinates of the tower unit may be compared to the coordinates of the location of at least one action of the irrigation system, and the step of comparing may occur at the remote unit. If a substantial match of the current location coordinates with one of the action coordinates associated with an action is detected, then the action corresponding to the current location coordinates may be initiated by the remote unit through controls of the center pivot irrigation system.

In another aspect of the invention, a system for determining a position of a rotatable arm of a center pivot irrigation system is disclosed. The system may comprise a tower unit for positioning on the rotatable arm at a distance from the center pivot of the irrigation system, the tower unit being positionable at an end tower of the irrigation system. The tower unit may comprise a Global Positioning Satellite (GPS) receiver configured to determine location coordinates of the tower unit, and a first transmitter for communicating the location coordinates. The system may also include a remote unit for positioning proximate to the tower unit for receiving location coordinates from the tower unit. The remote unit may comprise a first receiver for receiving the location coordinates transmitted by the first transmitter of the tower unit, a second transmitter for transmitting the location coordinates of the tower unit to a communication network, and a comparator configured to compare the location coordinates of the tower unit to at least one location coordinates corresponding to at least one action of the irrigation system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A significant advantage of the present invention is the simplicity of associating actions or functions of the irrigation system with the coordinates of the location of a tower unit positioned on the irrigations system's rotatable arm when the action or functions is to occur, so that the system is able to compare the coordinates associated with the action or function with the coordinates of the current location, and when a substantial match occurs, the action or function is initiated. The present invention does not require the calculation of angle or azimuths using multiple coordinates to determine the current position of the rotatable arm.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein:

FIG. 8 is a schematic depiction of the map/image of the present invention showing the band of operation of the end gun.

DESCRIPTION OF PREFERRED EMBODIMENTS

Figure 1:
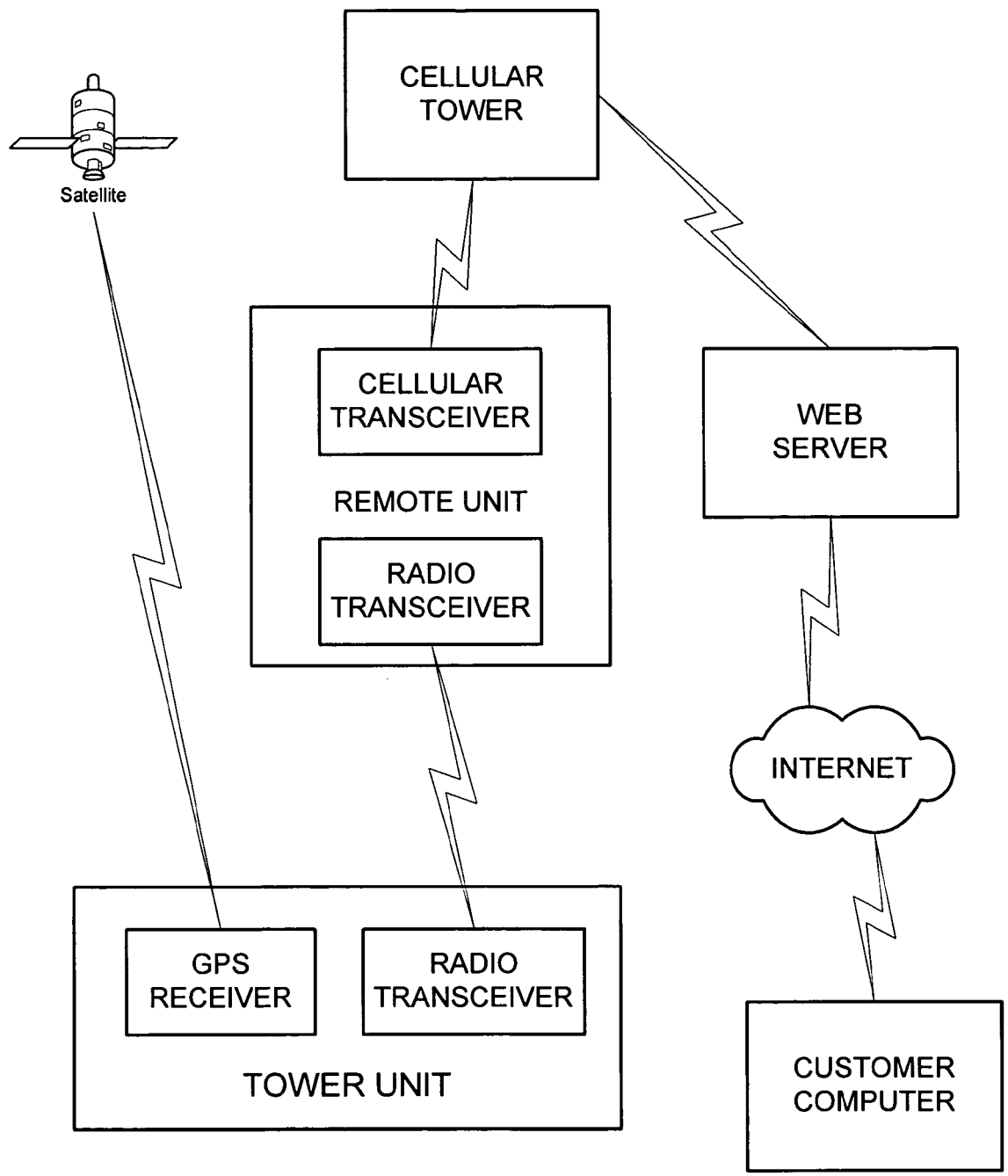
FIG. 1 is a schematic diagrammatic depiction of one version of a new irrigation arm position sensing apparatus according to the present invention, which provides both location monitoring and operation controlling aspects.

With reference now to the drawings, and in particular to FIGS. 1 through 8 thereof, a new irrigation arm position sensing system embodying the principles and concepts of the present invention and generally designated by the reference numeral 10 will be described.

In general, the irrigation arm position sensing system 10 of the invention employs a technique of determining a present location of an element of the system 10 that is mounted on the center pivot irrigation system 1, and comparing the present location of the element to a number of locations stored on the system 10, and then executes a function or action of the irrigation system 1 that is associated with that location during the operation of the irrigation system. The need to calculate the angular orientation of the center pivot irrigation system 1 is thus rendered superfluous and unnecessary for control of the irrigation system 1.

Figure 2:
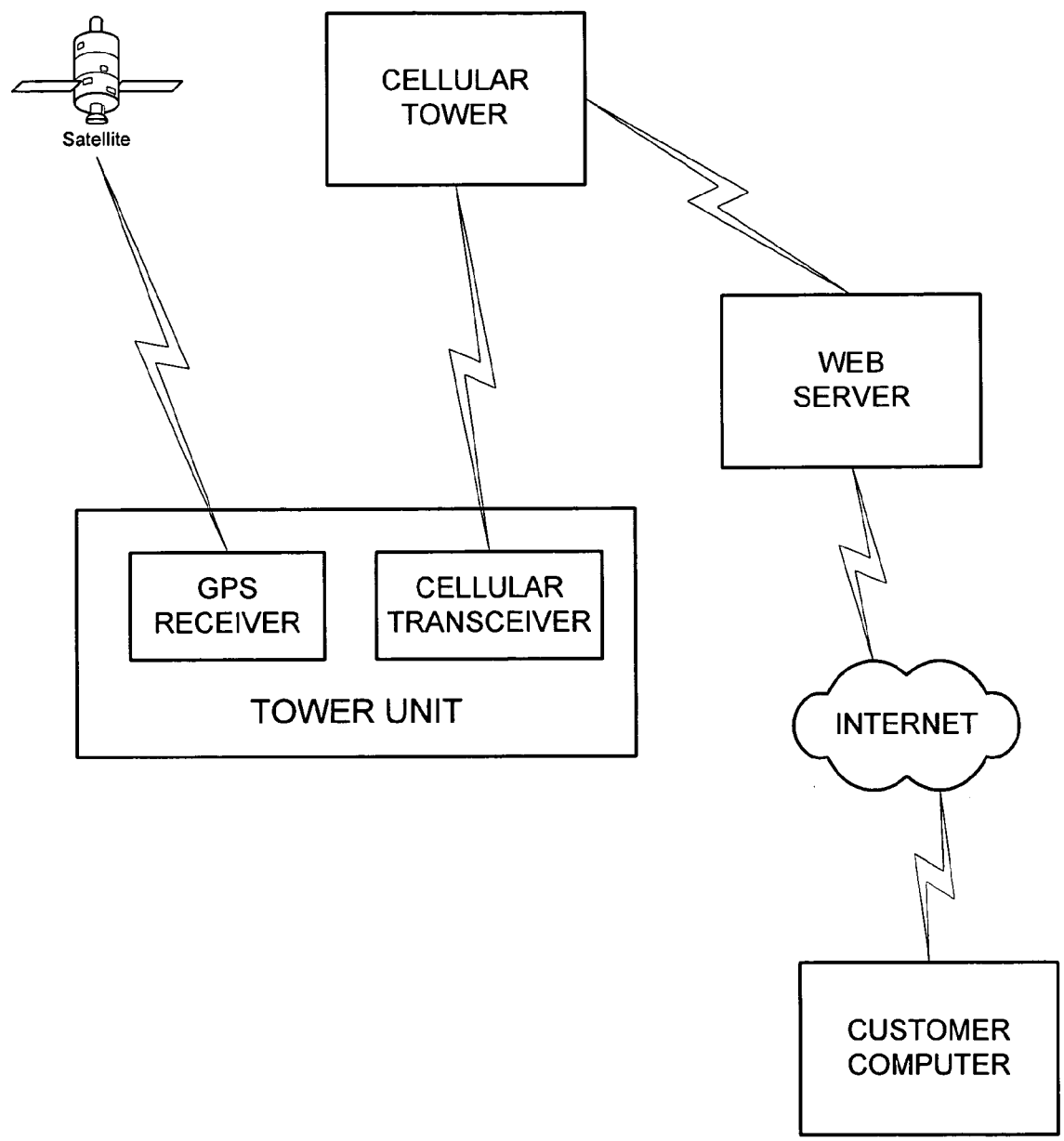
FIG. 2 is a schematic diagrammatic depiction of another version of the present invention, which primarily provides location monitoring aspects.

In greater detail, as best illustrated in FIGS. 1 and 2 of the drawings, one aspect of the invention is the system 10 that performs the operational aspects of the invention that are further described later in this specification. The system 10 may be embodied in at least two forms, which are depicted in FIGS. 1 and 2, although those skilled in the art will recognize that many other forms may be employed to perform the inventive operation.

Figure 3:
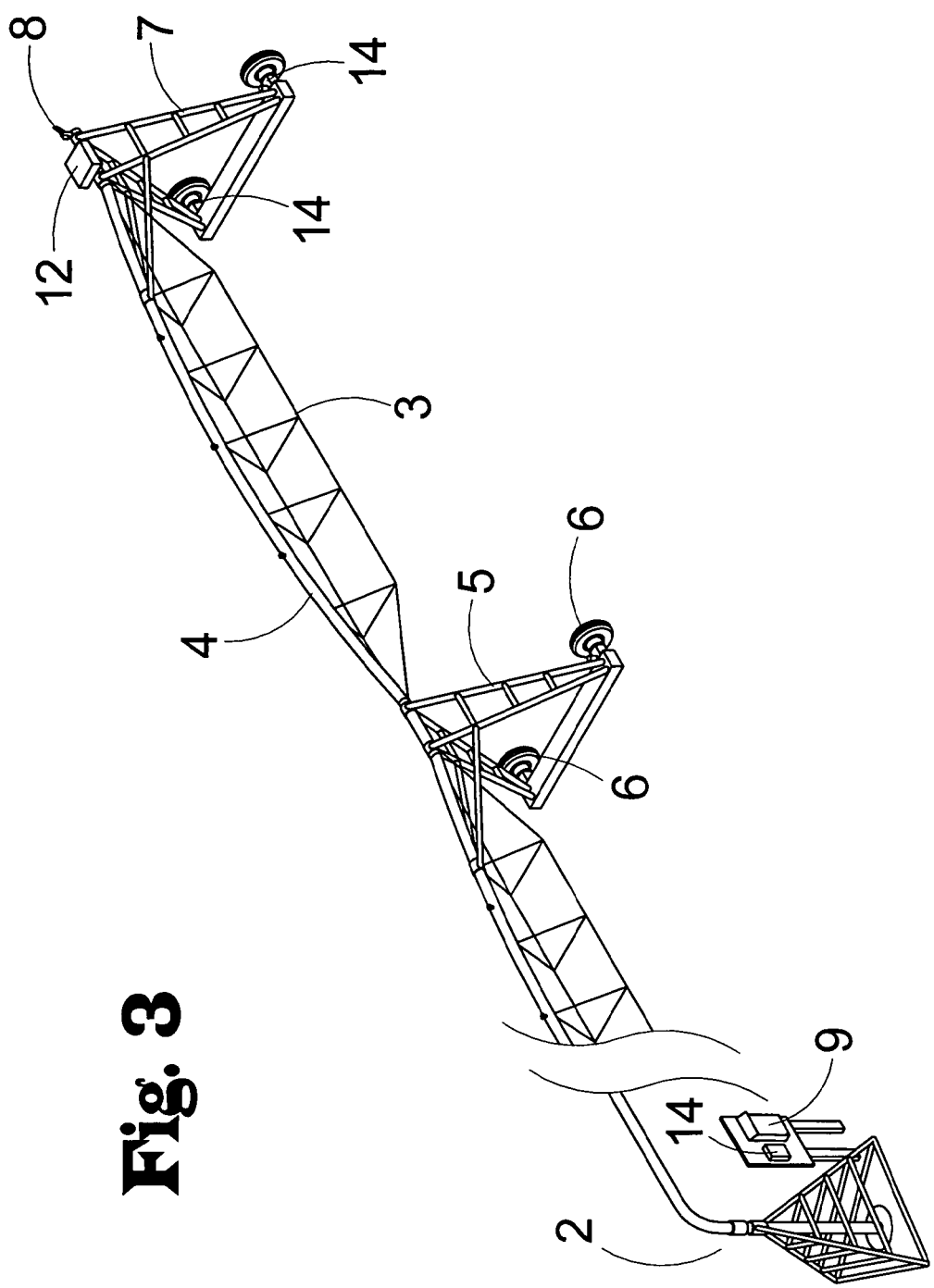
FIG. 3 is a schematic perspective view of an illustrative center pivot irrigation system with the location sensing system of the present invention.

Initially, for the purposes of this description, it will be useful to identify some of the pertinent elements of a center pivot irrigation system 1, such as the partial view of an irrigation system shown in FIG. 3 of the drawings. The center pivot irrigation system 1 includes a center pivot or tower 2 through which water flows to a rotatable arm 3, which includes a conduit or pipe 4 that radiates outwardly from the center pivot 2, and is supported by one or more towers 5 that are in turn supported on typically two or more wheels 6 that traverse the surface of the field that is to be watered. Various support trusses and the like may be employed to support the pipe 4 between the towers 5. The endmost tower 7 of the rotatable arm 3 may be provided with an end gun 8 that directs water outwardly from the end tower to reach areas of the field that are not traversed by the rotatable arm 3. The center pivot irrigation system 1 may have a number of functions that may be controlled. Conventionally, a control box or panel 9 is located in the field of the center pivot irrigation system 1, often at the center pivot 2, which can control the operation of the various elements and functions of the irrigation system through a program set at the control panel 9.

FIG. 1 of the drawings depicts one embodiment of the position sensing system 10 of the invention that is highly suitable for monitoring the location of the rotatable arm 3 of the center pivot irrigation system 1 as well as controlling various operations or functions of the irrigation system 1. In this embodiment, the position sensing system 10 may include a tower unit 12 that may be positioned on one of the towers 5 (or other portion) of the center pivot irrigation system 1, as long as the unit 12 is sufficiently spaced or separated from the center pivot to create a circular path that exceeds the expected accuracy of the GPS receiver. The tower unit 12 is preferably, but not necessarily, positioned on the endmost tower 7 of the system 1. A remote unit 14 may also be included in the system 10, and while its position or location with respect to the center pivot irrigation system 1 is less important than the position of the tower unit 12, the remote unit 14 should be within communication distance (either wireless or wired) from the remote unit 12. In some embodiments of the invention, the remote unit is located with the control panel 9, which (as previously noted) is often located at the center pivot 2, so that the remote unit can pass control commands to the controlling circuitry in the control panel.

The tower until 12 of the system 10 may include a number of elements, including a GPS receiver 16 for receiving GPS satellite signals (as well as other positioning signals) that indicate the coordinates of the location of the tower unit 12, as well as the tower 5 or other portion of the center pivot irrigation system that the tower unit is mounted on. The tower unit 12 may also include a means of communicating with the remote unit 14, and this communication means preferably may be a wireless communication device 18. The wireless communication device 18 may communicate, for example, over radio frequencies, but those skilled in the art will recognize that other wireless (and wired) communication technologies may be employed without departing from the invention.

The remote unit 14 of the system 10 may also include a number of elements, such as an additional means suitable for communication with the wireless communication device 18. In one embodiment of the invention, the means for communication of the remote unit 14 comprises a second wireless communication device 20 that communicates in a manner compatible with the first wireless communication device 18. As noted previously, the communication devices 18, 20 could be wired communication devices, although the wireless capability has several advantages, including the ability to move the tower unit 12 (and the remote unit 14, for that matter) between towers and even between center pivot irrigation systems without having to route and reroute wires. With the provision of the communication device 20 in the remote unit 16, the tower unit 12 is able to communicate location information to the remote unit 14, and this location information can be, for example, communicated to the control panel 9 for triggering operations or functions of the center pivot irrigation system 1. Optionally, the communication devices 18, 20 may each be capable of both transmitting and receiving (e.g., a transceiver) so that, for example, the remote unit may query the tower unit as to status, and even transmit commands to be executed at the tower, such as turning an end gun "on" and "off".

The remote unit 14 may further include another means for communicating that is suitable for communicating over longer distances for the purpose of communicating with entities at a greater distance. For example, the entity may accessible through the Plain Old Telephone System (POTS) or wireless communication network and the entity may reside on a data network. In one of the preferred implementations of the invention, the cellular telephone system is utilized and a cellular transceiver 22 is employed in the remote unit 14 to provide communication ability to a cellular antenna or tower in the region of the center pivot irrigation system. The entity may thus be a web server 26 that is able to communicate with the POTS or cellular telephone network 24 and also with the Internet data network. Of course, other means for communicating may be employed, but as access points to cellular networks (i.e., antennas) become more ubiquitous, even in rural areas, the cellular transceiver 22 provides wireless communication to the cellular network 24 (and thus provides access to the POTS network) without having to run a hard wired connection to the field, which can be prohibitively expensive. It will be recognized by those skilled in the art that the type or types of networks on which the invention is implemented may be varied without departing from the spirit of the invention. The cellular transceiver 22 of the remote unit is thus able to communicate with the web server 26 through the cellular network 24 by dialing the web server. The web server 26 is thereby able to receive location and status information from the remote 14 and tower 12 units, while the server is able to provide operational programs to the remote unit 14 and the control panel 9. The web server 26 is in turn accessible by the user's or customer's computer 28 through the Internet or other network. The user is thus able to communicate instructions, or programs of instructions, to the remote unit and the control panel of the center pivot irrigation system.

A unit of the system 10, such as the remote unit 14, may include a comparator that is configured to compare the location of the tower unit 12 to at least one location which corresponds to at least one action to be taken by the irrigation system. Further, a unit of the system 10, such as the remote unit 14, may also include storage for storing at least one location and the corresponding action to be taken by the irrigation system, and the storage may be accessible by the comparator for executing comparisons. In some implementations, the system 10, such as through the remote unit 14, may be interfaced to controls of the center pivot irrigation system 1 and may be configured to cause the center pivot irrigation system, through the controls thereof, to take the at least one action when the location of the tower unit 12 substantially matches the location that correspond to the action associated with the location.

FIG. 2 of the drawings depicts another embodiment of the position sensing system 10 of the invention that is highly suitable for monitoring the location of the rotatable arm 3 of the center pivot irrigation system 1. As in the embodiment of FIG. 1, the tower unit 12 is positioned on one of the towers 5, and may be on the endmost tower 7. In this implementation, the tower unit 12 includes the GPS receiver 16 for receiving GPS satellite signals and determining the location of the receiver (and thus the tower unit 12). The tower unit also includes the cellular transceiver 22 for transmitting the location information to the cellular or other communication network 24, and through the cellular network to the web server 26. Similarly, this provides access through the Internet to the customer's computer 28. In this embodiment, the remote unit 14 is not present, and the ability of the system 10 to control the functions or actions of the center pivot irrigation system 1 is limited or completely absent.

One aspect of the invention involves a method of determining a location of the rotatable arm of a center pivot irrigation system using signals from a GPS satellite, and using that location information to control aspects of the operation of the center pivot irrigation system. In some embodiments of the invention, control instructions are transmitted to the center pivot irrigation system over a network (such as the POTS communication network) and the location information is used in applying those control instructions. Further, the location information may be periodically transmitted over the network to the web server on the network so that the user of the center pivot irrigation system can access the periodically updated location information.

In one implementation of the method of the invention, a site on a network is provided for the purpose of monitoring and controlling the center pivot irrigation system, and the site is accessible over the network by the user for at least these purposes. As previously noted, in at least some implementations the network is the Internet and the site on the network is a website. A web page may be provided on the website with information pertaining to the center pivot irrigation system 10 of interest to the user, and the website may include other web pages directed to other center pivot irrigation systems and accessible to this or other users of the system 10. The information may include, for example, information about the current position of the rotatable arm and information about any control instructions currently loaded on the system and being executed by the system.

In some implementations, the website includes a plurality of maps and/or images for facilitating initial setup of the invention on the user's system, including the user's web page for the center pivot irrigation system. The user may be provided with a choice of utilizing a photographic image of the area being irrigated by the subject center pivot irrigation system, or a cartographic map of the area being irrigated (for example, a political map or a topographic map). Optionally, a combination of these formats may be provided to the user. It should be recognized that other types of two dimensional and three-dimensional representations of the area being irrigated may also be utilized. For the purposes of this description, the representation of the area being irrigated, whether a map or an image or other type of representation, will be referred to as a map/image. At least one of the plurality of map/images on the site may include one or more visual representations of center pivot irrigation systems that may be controlled, or are controllable, through the site.

Figure 4:
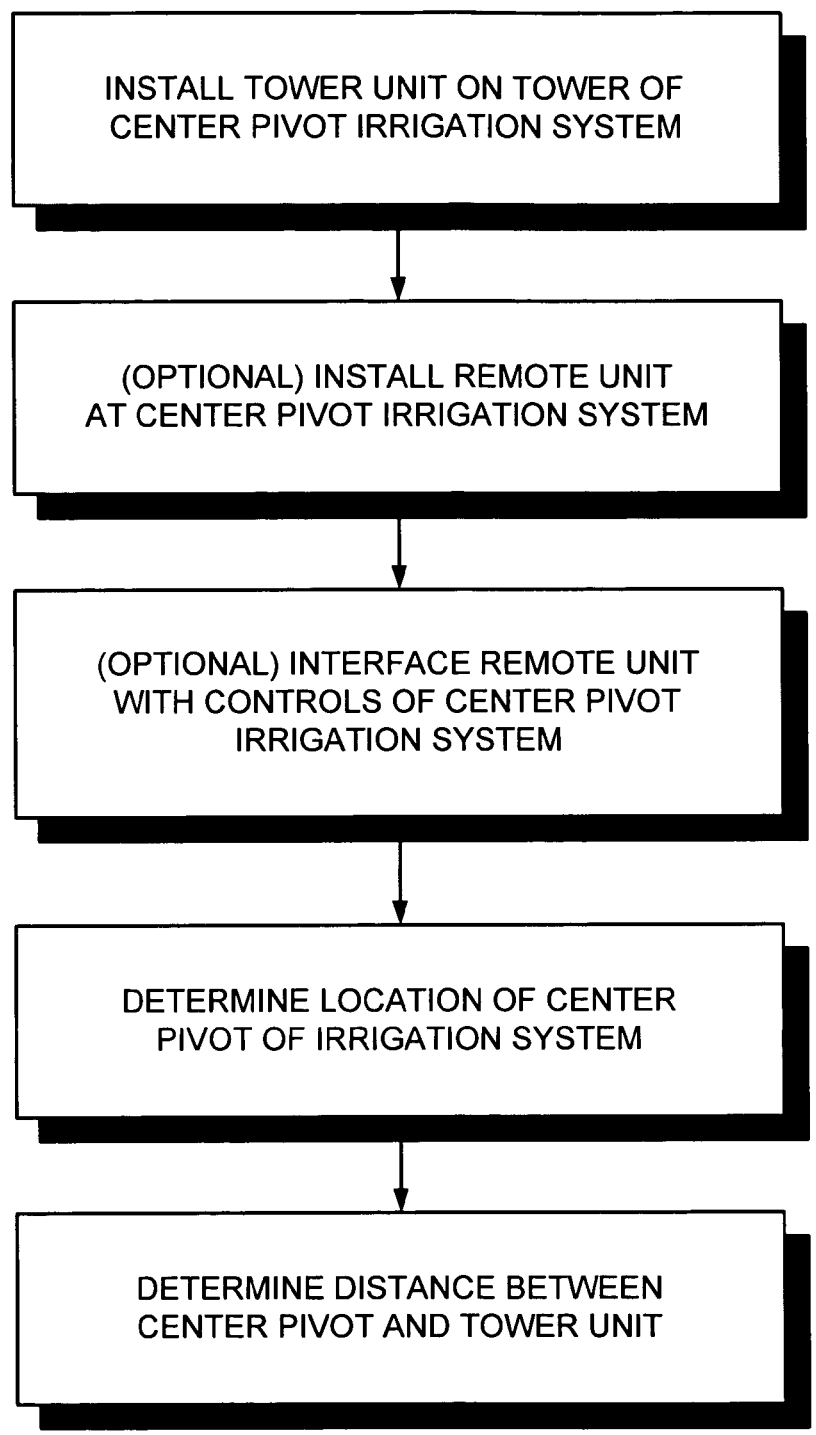
FIG. 4 is a schematic flow chart diagram of one aspect of the method of the present invention.

An initial step of the initial set up process of the system 10 includes installing the elements of the system 10 on the center pivot irrigation system 1, such as is depicted in FIG. 4 of the drawings. The tower unit 12 may be mounted on the tower of the tower 5 of the irrigation system 1, and, depending upon the embodiment of the system 10 being implemented, the remote unit 14 may be installed on or by the irrigation system 10, and the remote unit 14 may be interfaced with the control panel 9 of the irrigation system to permit control by the remote unit 14 of the control panel. At this point, the user may determine the location of the center of rotation of the rotatable arm 3, which is typically the location of the center pivot 2, of the irrigation system 1 by any suitable manner. The user may further determine the distance between the center of rotation, or center pivot, and the location of the tower unit 12 on one of the towers 5 of the irrigation system 10.

Figure 5:
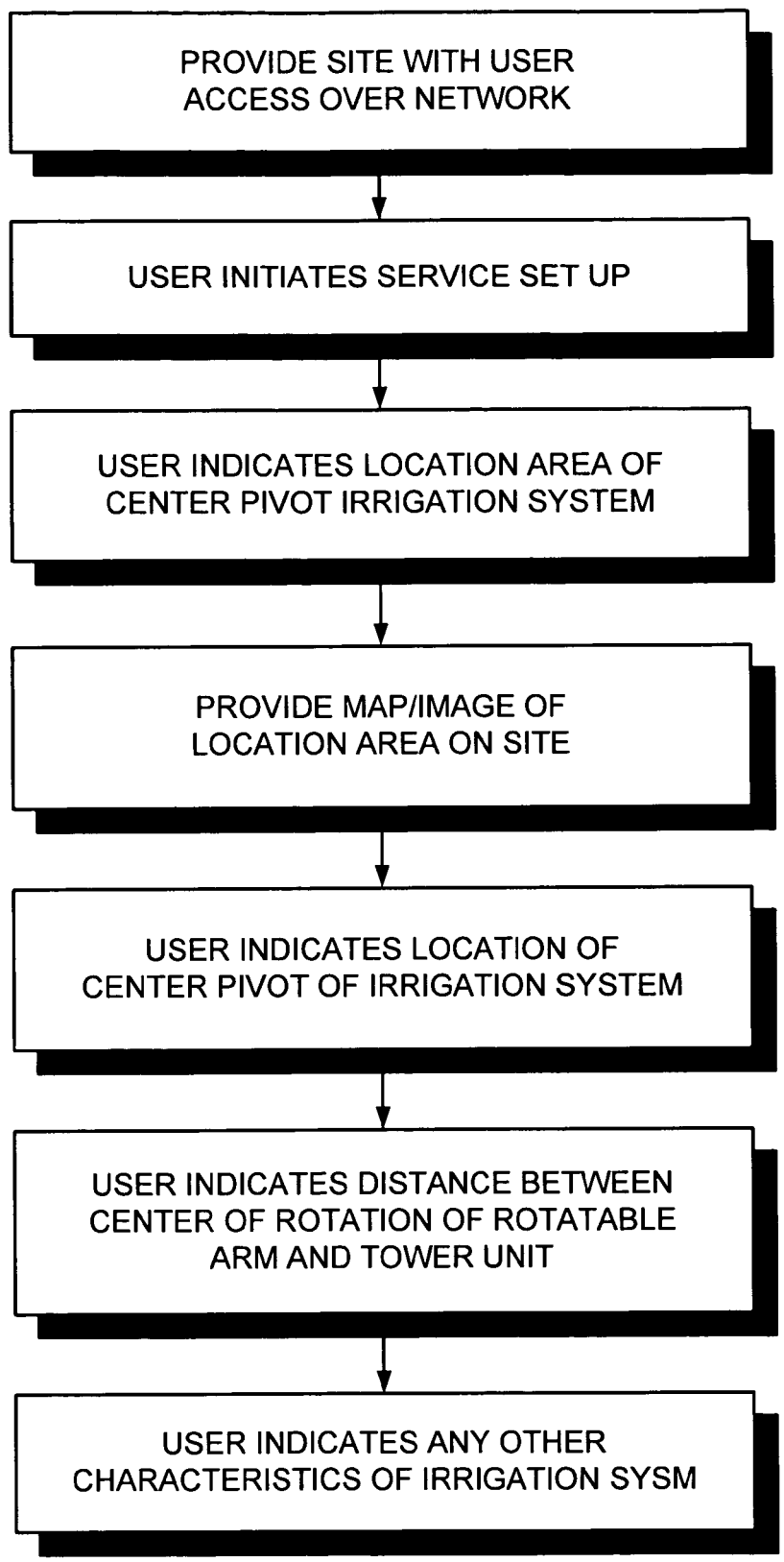
FIG. 5 is a schematic flow chart diagram of another aspect of the method of the present invention.

Initially, a set up process may be initiated by the user to set up or initiate the monitoring and/or controlling of the center pivot irrigation system, such as is depicted in FIG. 5 of the drawings. The user may be provided with access to the website on or through the network for the purpose of providing initial information to permit a page or other record to be created for the particular center pivot irrigation system of the user to be controlled, to permit the center pivot irrigation system to monitored and controlled via the website.

An initial step of the initial set up process for the website may allow the user to indicate the location of the center pivot irrigation system 1 to be controlled. This process may begin with the user's indication of a location of the center pivot tower of the center pivot irrigation system, and the receipt by the website of the location. In some implementations, the location is designated by the user in terms of coordinates, such as the latitude and the longitude, for the location of the center pivot tower. In other implementations, the user may simply indicate a location in general terms, such as a general area (for example, street address), and the site presents a map/image of the area indicated if such a map/image is available. The user may then indicate the location of the center pivot tower with greater precision through the interface, such as by using a cursor pointer on the interface. Generally, the provision of the coordinates of the center pivot tower is preferred as typically being more accurate. Such coordinates may be determined in a number of different ways, but the user of a GPS device may be the most convenient.

Once the location of the center pivot 2 has been determined, a distance or length of the rotatable arm 3 between the center pivot 2 of the irrigation system 1 and the position of the tower unit 12 on the arm 3 may be provided by the user to the system 10. In most implementations of the invention, the tower unit 12 with the GPS signal receiver 16 is positioned at the endmost tower of the rotatable arm, and thus the length of the rotatable arm may be equal to the distance between the center pivot 2 and the endmost tower 7. This configuration is likely to produce the most accurate locating of the system 1 using the GPS signal receiver 16. As will be appreciated from the following, greater accuracy of monitoring and control is possible as the distance between the center pivot tower and the tracking tower is increased.

The distance between the center pivot 2 and the endmost tower 7 may be determined through direct physical measurement in the field of the distance. In a highly advantageous implementation of the invention, determining the distance involves positioning the tower unit 12 on the endmost (or other) tower 7 in the field. An initial location indication is then received from the GPS receiver 16 of the remote unit 14 (through the cellular network 24). The location is then used to pull up the map/image of the area of the center pivot irrigation system 1, and the location of the center pivot 2 may be visually determined on the map/image by an operator using the map/image. Using the initial location information received from the GPS receiver 16, and the visually-determined location of the center pivot 2, the distance between the remote unit 14 and the center pivot 2 may be determined remotely (after the remote unit 14 has been installed on the tower in the field) without having to physically and directly measure the distance between the center pivot 2 and the tower.

The user may also provide to the website, and the system may receive from the user, other information about the center pivot irrigation system, such as whether the irrigation system has an end gun mounted on the endmost tower of the rotatable arm, and what is the length of a water stream from the end gun.

If the user has additional center pivot irrigation systems 1 that are to be controlled through the system 10, the user may repeat one or more of the steps described above for each of the irrigation systems. The system may provide monitoring and control aspects for a plurality of the irrigation systems.

Figure 6:
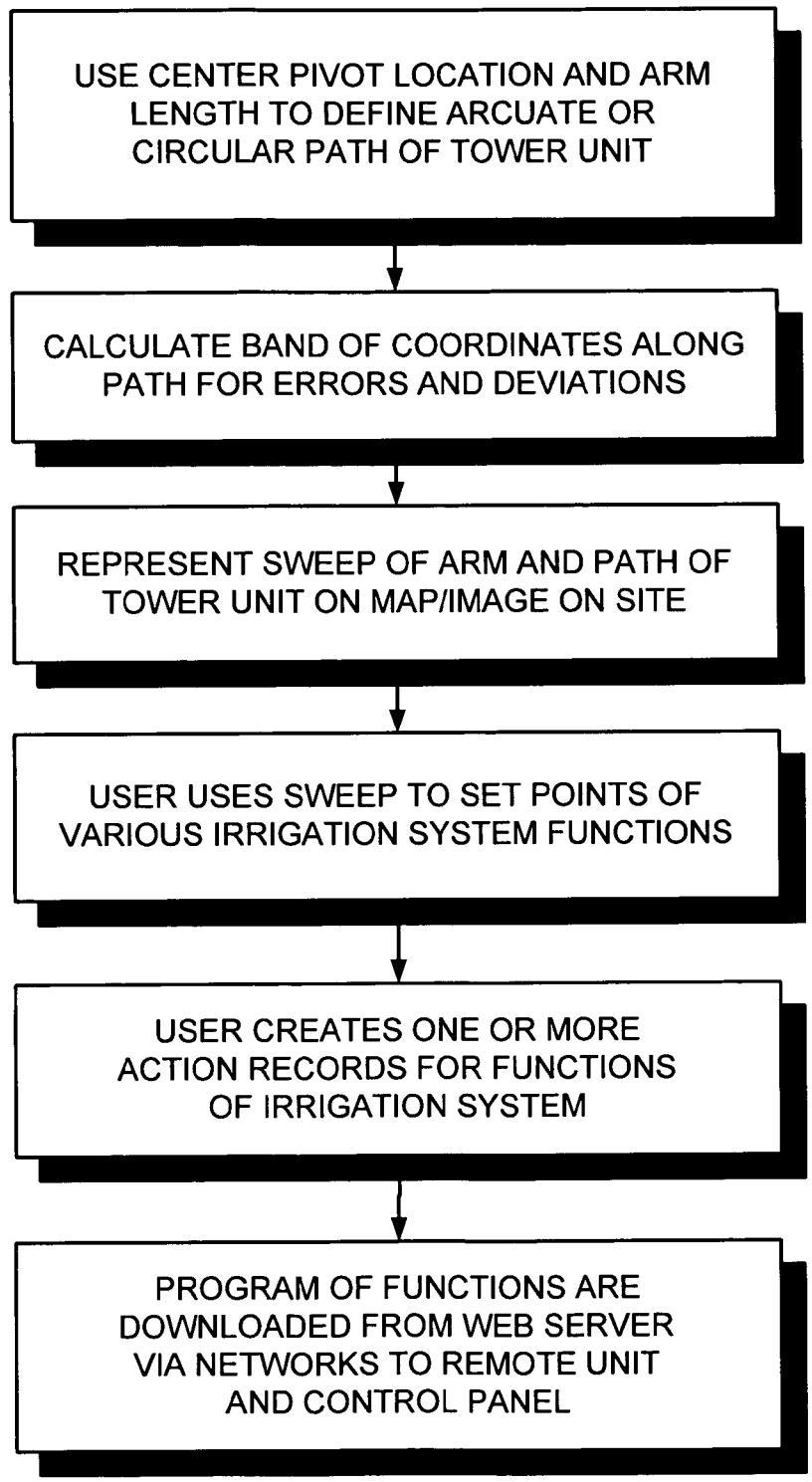
FIG. 6 is a schematic flow chart diagram of another aspect of the method of the present invention.

In one significant aspect of the invention, such as is depicted in FIG. 6 of the drawings, the initial set up process of the system 10 may further include the generation of a set or range of coordinates that correspond to the path of locations over which the GPS signal receiver 16 of the tower unit 12 is estimated or expected to move along as the rotatable arm rotates with respect to the center pivot. Using the coordinates of the center pivot 2 provided by the user, and the length of the rotatable arm from the center pivot to the tower unit 12, an arc or circle of coordinates may be calculated for the path over which the tower unit is expected to travel throughout the movement of the rotatable arm about the center pivot. This arcuate or circular path is generally centered on the center pivot 2 of the irrigation system 1, and includes a line of coordinates located along the circumference of the arcuate or circular path, but does not include the interior locations of the arc or circle, such as the locations between the circumference and the center pivot 2. Thus, the set of coordinates does not include the coordinate of the center pivot 2, as the tower unit (and the GPS receiver 16) will be maintained at a distance substantially equal to the length from the center pivot 2 and will not move through the location of the center pivot 2. The coordinates of the path may be stored on the system for user retrieval when the user indicates the locations on the map/image that various control actions are to take place. Once the path of the tower unit 12 has been calculated, the coordinates of the center pivot is no longer used, and it is possible that the coordinate of the center pivot may be deleted after the calculation of the path. The coordinate of the center pivot 2 would not be needed again, unless for some reason the path would need to be recalculated, such as, for example, a change in the length from the center pivot to the tower unit and the GPS receiver.

It should be noted at this point that the coordinates of the path need not be, and preferably are not, limited to just the coordinates of the precise line of coordinates along the circumference of the arc or circle about the center pivot at the precise distance of the tower unit from the center of rotation. The coordinates of the path may be expanded to include coordinates at a slightly shorter and slightly longer radius distance from the center pivot to create a band or strip of coordinates along the path that extends laterally from the circumferential line. This aspect of the invention can help to account for relatively small variations that may occur in the GPS coordinate readings made by the GPS signal receiver as it is moving along the path, as well as variations in land topography that can also cause variation in the GPS readings by the GPS receiver.

Figure 7:
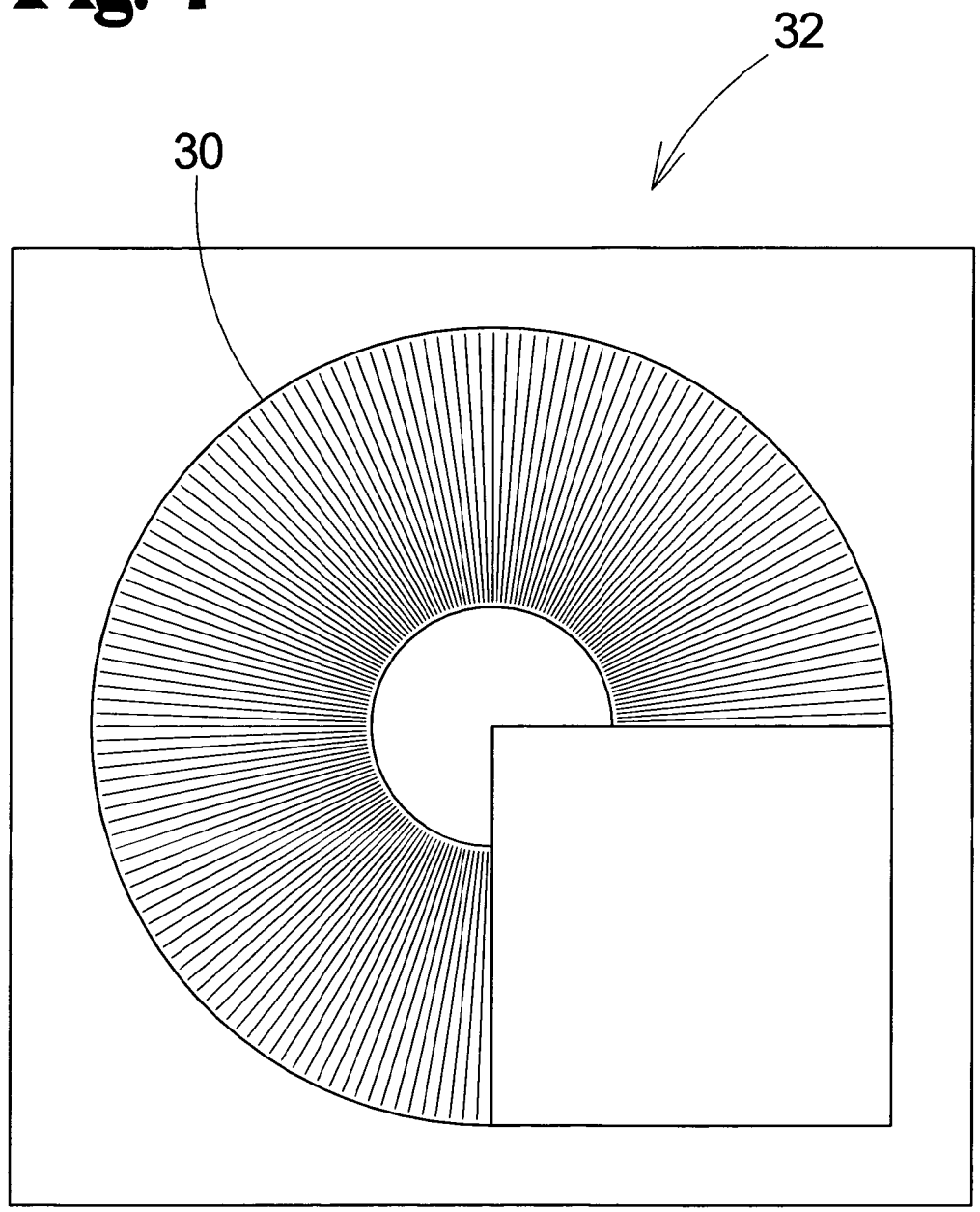
FIG. 7 is a schematic depiction of the map/image and sweep of the present invention.

Once the coordinates of the path of the tower unit have been determined, the sweep 30 of the rotatable arm may be visually represented or depicted on the map/image 32 on the web page for the subject center pivot irrigation system (see FIG. 7). The sweep 30 of the rotatable arm may be represented on the map/image by a different and preferably contrasting color that overlies the portion of the map/image that corresponds to the circle (or portions thereof) over which the rotatable arm moves. The representation of the sweep 30 may be partially transparent or translucent so that some of the underlying detail of the map/image shows through the representation of the sweep. This visualization of the sweep of the rotatable arm 3 can facilitate the user's entry of control information for programming the system to control the irrigation system, such as, for example, by the user moving the cursor of the interface across the map/image 32 on the web page and clicking on the desired location of the rotatable arm 3 when the desired action is to take place. Further, a partial band 34 may be depicted on the map/image 32 that indicates the operation ("on" state) of the end gun 8 along the perimeter of the sweep 30.

In another aspect of the method of the invention, a programming process of the system 10 may be implemented that includes an initial scheduling procedure that is conducted on the web page and an instruction download procedure that occurs after the initial scheduling procedure has been completed. The initial scheduling procedure may include the user initiating an action record for the system, which corresponds to an action or operation that the user wants the irrigation system to take at a particular location of the tracking tower. The number of action records may be limited for each particular center pivot irrigation system to be monitored and controlled.

Upon the invocation of an action record, the user indicates the aspect of the center pivot irrigation system that is to be controlled. For example, many center pivot irrigation systems are provided with an end gun, and are also provided with the capability to turn the end gun on and off based upon the position of the rotatable arm. Further, the center pivot irrigation system often has the capability to start and stop the movement of the rotatable arm, change the direction of movement of the rotatable arm, turn a water pump on and off, adjust the rate at which the water is applied to the field, provide delays in the movement of the rotatable arm for a set period, as well as turn on and off various auxiliary devices and controls. To create or change the action record, the user may indicate what type of action is to be taken, and the action may be inputted by the user or may be selected from a list of optional actions on the web page. The user may indicate a position of the rotatable arm at which the selected action is to occur. Preferably, this indication is made by the user moving the cursor on the map/image to the position of the rotatable arm at which the indicated action is to occur, and clicking on that location. The system reads the position of the cursor at the point that the mouse or other pointing device is clicked, and records that position of the tracking tower in the action record.

Upon the completion of the information in the action record, the depiction of the center pivot irrigation system may be updated to reflect the inclusion of the action record in the operation program for the irrigation system. For example, the operation of the end gun may be depicted in the map/image by an arcuate band that extends along the portion of the sweep of the rotatable arm that corresponds to the end gun being turned on, and the band may terminate at the location on the sweep that the gun is turned off. The user is thus provided with a visual indication on the map/image of the portions of the sweep at which the end gun is operating, and may provide a depiction of the area of the field that is being watered by the operation of the end gun. As another example, different modes of operation of the rotatable arm may be depicted on the sweep on the map/image by areas of different colors, so that, for example, an area over which the rotatable arm moves forwardly is depicted in one color, an area over which the rotatable arm moves in a reverse direction may be depicted in another color, and other operations may be shown in other different colors.

When the user indicates that the operation of the center pivot irrigation system that is represented in the action records is to be implemented, the instruction download procedure is initiated. The system 10 assembles the action records and coordinates information together for download to the remote unit 14 through the various communication networks.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for operating a rotatable arm of a center pivot irrigation system, the system comprising:
   a tower unit positionable on the rotatable arm of the irrigation system at a position spaced from a center of rotation of the rotatable arm;
   a Global Positioning Satellite (GPS) receiver at the tower unit, the GPS receiver being configured to determine a location of the tower unit as the tower unit moves along a path as the rotatable arm pivots about the center of rotation;
   a receiver configured to receive, over a wireless communication network, a schedule for operating the irrigation system as the rotatable arm rotates, the schedule including at least two instructions for taking an action by the irrigation system, each instruction including an action to be taken by the irrigation system and a corresponding location at which the action is to be taken;
   storage in communication with the receiver and configured to store the schedule of instructions received by the receiver; and
   a comparator configured to receive information regarding the location from the GPS receiver and compare the location of the tower unit to a location in the instructions of the schedule stored on the storage;
   wherein the system is configured to interface with controls of the center pivot irrigation system to initiate an action by the irrigation system when the location of the tower unit corresponds to a location for taking the action in one of the instructions stored on the storage.

2. The system of claim 1 additionally comprising a remote unit configured to interface with the controls of the center pivot irrigation system.

3. The system of claim 2 wherein the tower unit is movable with respect to the remote unit.

4. The system of claim 1 additionally comprising a remote unit configured to interface with the controls of the center pivot irrigation system; and
   wherein the remote unit is configured to cause the center pivot irrigation system through the controls to take an action of one of the instructions when the location of the tower unit substantially matches the location in one of the instructions.

5. The system of claim 1 wherein the GPS receiver is integrated into the tower unit.

6. The system of claim 1 wherein the tower unit includes a first transmitter for communicating the information regarding the location determined by the GPS receiver.

7. The system of claim 6 additionally comprising a remote unit including a first receiver configured to receive the information regarding the location transmitted by the first transmitter of the tower unit.

8. The system of claim 7 wherein the remote unit includes a second transmitter configured to transmit the information regarding the location of the tower unit to a location remote from the irrigation system over the wireless communication network.

9. The system of claim 8 wherein the first transmitter comprises a radio transmitter configured to communicate with the second transmitter of the remote unit.

10. The system of claim 8 wherein the second transmitter comprises a cellular telephone and the communication network comprises a cellular telephone network.

11. The system of claim 1 wherein the remote unit includes the storage.

12. The system of claim 1 wherein the remote unit includes the comparator.

13. An irrigation system comprising:
    a center pivot irrigation apparatus comprising:
    a rotatable arm rotatable about a center pivot; and
    controls configured to control operation of the rotatable arm;
    a system for operating the center pivot irrigation apparatus, the system including:
    a tower unit for positioning at the rotatable arm at a distance from the center pivot of the irrigation system;
    a Global Positioning Satellite (GPS) receiver configured to determine a location of the tower unit;
    a receiver configured to receive, over a wireless communication network, a schedule for operating the irrigation system as the rotatable arm rotates, the schedule including at least two instructions for taking an action by the irrigation system, each instruction including an action to be taken by the irrigation system and a corresponding location at which the action is to be taken;
    storage in communication with the receiver and configured to store the schedule of instructions received by the receiver; and
    a comparator configured to receive information regarding the location from the GPS receiver and compare the location of the tower unit to a location in the instructions of the schedule stored on the storage;
    wherein the system is configured to interface with controls of the center pivot irrigation system to initiate an action by the irrigation system when the location of the tower unit corresponds to a location for the action in one of the instructions stored on the storage.

14. The system of claim 13 further comprising a remote unit configured to interface to the controls of the center pivot irrigation system.

15. The system of claim 13 wherein the remote unit is configured to cause the center pivot irrigation system through the controls to take an action of one of the instructions when the location of the tower unit substantially matches the location in one of the instructions.

16. The system of claim 13 wherein the tower unit is movable with respect to the remote unit.

17. A method for determining a position of a rotatable arm of a center pivot irrigation system, comprising:
    providing a pivot arm position sensing system including a tower unit positionable at the rotatable arm of the irrigation system and a Global Positioning Satellite (GPS) receiver at the tower unit;
    receiving, from a user of the irrigation system over a communication network, a schedule for operating the irrigation system as the rotatable arm rotates, the schedule including at least two instructions for taking an action by the irrigation system, each instruction including an action to be taken by the irrigation system and a corresponding location at which the action is to be taken,
    downloading the schedule of instructions over a wireless communication network to storage on the position sensing system;

determining a location of the tower unit as the tower unit moves along a path of the tower unit as the rotatable arm pivots about the center of rotation using the GPS receiver at the tower unit; and initiating an action by the irrigation system by the position sensing system when the location of the tower unit corresponds to the location in one of the instructions stored on the position sensing system.

18. The method of claim 17 wherein the downloading of the schedule of instructions is performed over a cellular telephone communication network.

19. The method of claim 18 additionally comprising interfacing a remote unit of the position sensing system to controls of the irrigation system, and wherein the schedule of instructions are downloaded over the wireless communication network to the remote unit and through the remote unit to the controls of the irrigation system to cause an action by the irrigation system.

20. The method of claim 17 additionally comprising transmitting information regarding the location of the tower unit by the position sensing system over the wireless communication network to a server in a location remote from the irrigation system.

21. The method of claim 20 wherein the server is interfaced to a second network through which data regarding the location is accessible by a user.

22. The method of claim 20 additionally comprising displaying, on a site generated by the server and accessible by a user over a communication network, a depiction of the corresponding position of the rotatable arm in a representation of an agricultural field corresponding to the transmitted location.

23. The method of claim 22 wherein the depiction includes a visual indication indicating a position of the rotatable arm at which an action is to be taken by the irrigation system.

24. The method of claim 20 additionally comprising storing on the server the schedule including a plurality of the instructions.

25. The method of claim 17 additionally comprising providing a site on a network for monitoring a position of the rotatable arm and controlling actions of the center pivot irrigation system based upon information regarding a location transmitted to a server over the communication network.

26. The method of claim 25 additionally comprising determining on the server an arc of locations corresponding to locations of the tower unit as the rotatable arm rotates about the center of rotation, and visually depicting the arc of locations on the site.

27. The method of claim 17 additionally comprising providing a server in a location remote from the irrigation system;

downloading a photographic image of a field at which the irrigation system is located, and superimposing a depiction of the irrigation system on the photographic image of the field in a position corresponding to a location of the irrigation system in the field.

* * * * *